Patented Nov. 16, 1926.

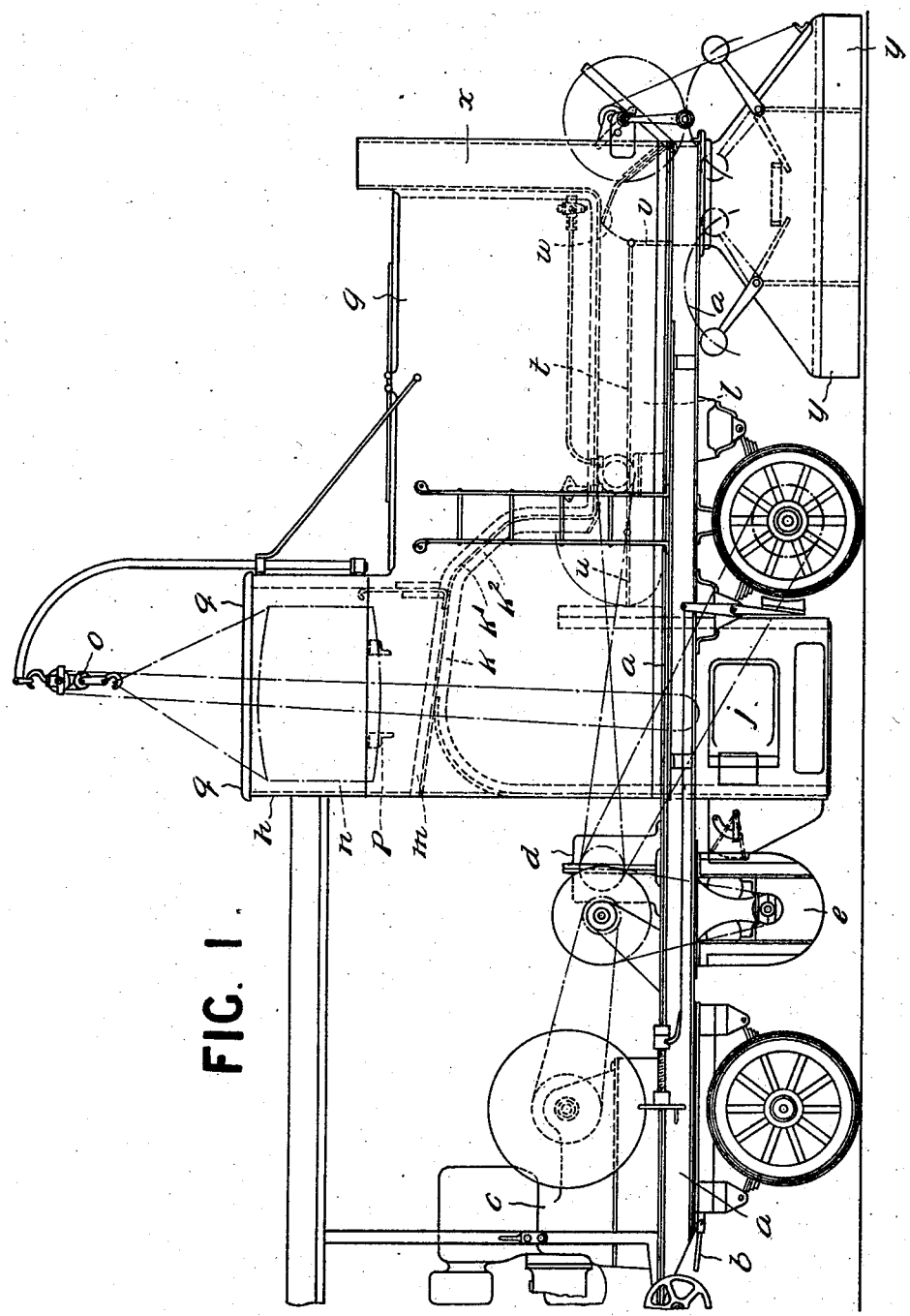

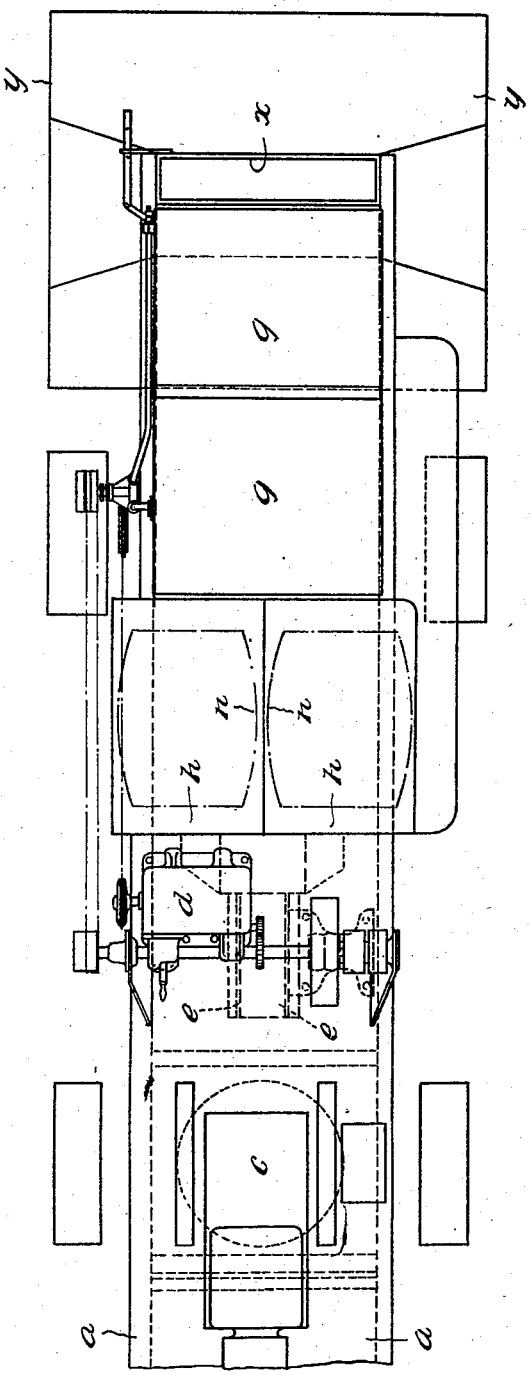

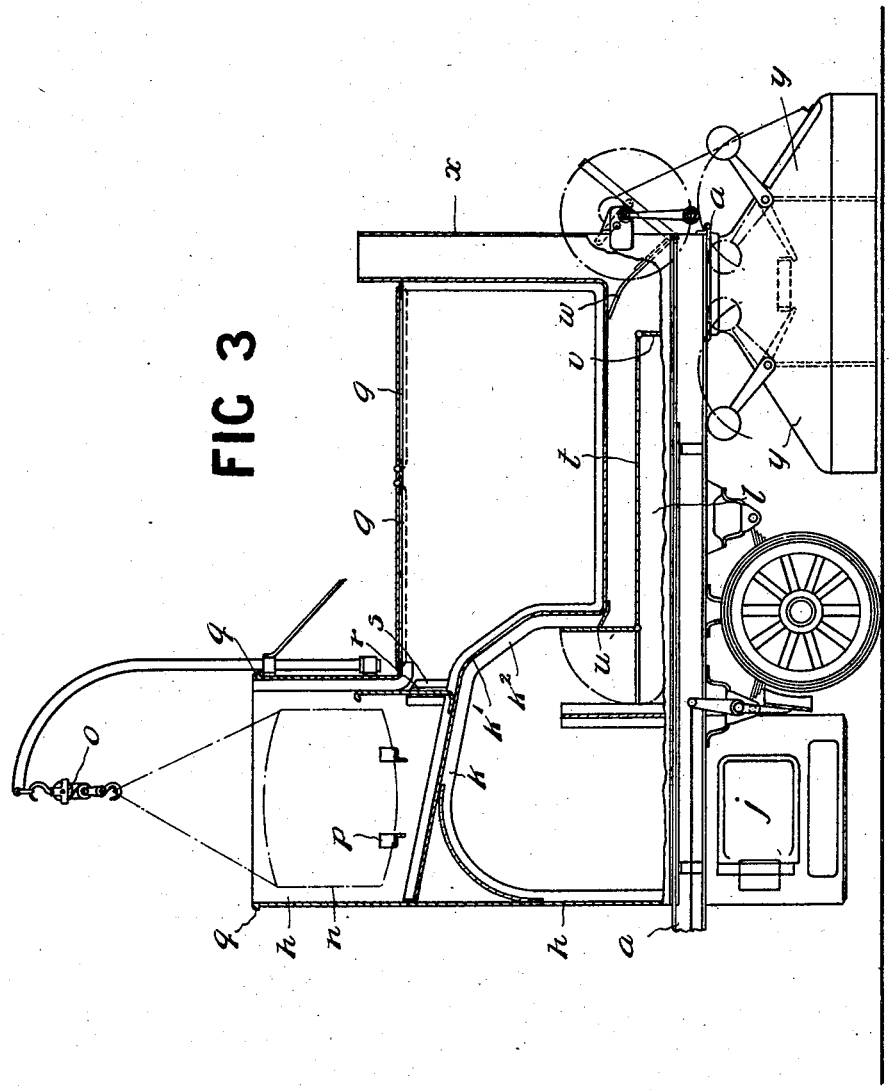

1,606,995

UNITED STATES PATENT OFFICE.

JOHN HINES, OF LONDON, ENGLAND.

APPARATUS FOR THE MAKING AND REPAIRING OF ROADS AND LIKE SURFACES.

Application filed July 29, 1925, Serial No. 46,716, and in Great Britain September 19, 1924.

This invention relates to apparatus for the making and repairing of roads and like surfaces, and refers particularly to boilers or heaters for tar, bitumen, and like materials employed for spraying and grouting operations.

The object of my invention is to provide a boiler or heater in which tar, bitumen, or other material as delivered from barrels or other containers is rapidly and efficiently heated to the required degree, and is strained to remove any foreign matter before passing over a heated weir into a heated storage tank from which it is drawn off as required.

My invention comprises apparatus consisting of a raised tank arranged above a suitable furnace or other heating means, and having an inclined bottom sloping downwardly towards removable straining or filtering devices through which the heated material passes on its way over a heated weir to a heated storage tank from which the material is drawn off as required, the material in the already heated storage tank being kept hot by a large volume of hot air and gases from the furnace or the like circulating through flues within or adjacent to the storage tank.

The tar, bitumen or other material is delivered from barrels or other containers directly into the heating tank, or the barrels themselves may be placed in the tank.

The tank is kept at a high temperature by the furnace beneath it, and the material is rapidly heated to bring it into a sufficiently liquid state. Owing to the inclination of the bottom of the tank, the material as it becomes liquid drains downwardly through one or more removable vertical filtering plates or walls by which all foreign matter is retained, and the clear liquid passes through suitably controlled passages and over the heated weir into the heated storage tank. These and other features of my invention are illustrated in the accompanying drawings which show one practical form of the apparatus.

In these drawings:—

Figure 1 is a side elevation and Figure 2, a plan of a complete road making and repairing machine embodying my invention.

Figure 3, is a sectional elevation on an enlarged scale of the means for heating and storing the bitumen or other material.

In the form illustrated the whole of the apparatus forming the machine is mounted upon a wheeled chassis or running frame $a$ provided with a towing bar $b$ by which it is adapted to be coupled behind a tractor or the like if desired.

At the forward end of the chassis is mounted an internal combustion engine $c$ driving by chain to a gear-box $d$ from which drives are taken to a fan or blower $e$ for providing forced draught to the furnace, and for delivering from the furnace a sufficient volume of heated air and gases to perform the functions set forth below.

The engine may also be connected through a clutch to one or more of the road wheels for propelling the machine along a road at any desired speed in either direction. Alternatively, the machine as a whole may be mounted on a steam or other wagon. A drive is also taken from the gear-box to a pump $f$ by which the heated bitumen or other material is sprayed, grouted, or otherwise delivered on to the road surface.

Mounted on the rear end of the chassis is the tank $g$ for the heated material and within the forward end of the tank is the hot-air chamber $h$ forming the upper part of the furnace $j$ which is itself mounted below the chassis. The furnace $j$ has a curved upper closure $k$ which is inclined downwardly to meet the flue $l$ running horizontally below the tank, a baffle $l'$ being provided to ensure that the hot gases are thrown upwardly against the closure $k$. This closure together with an inclined extension $m$ forms the bottom of the heating chamber $h$ for the bitumen or other material which is in the form of a closed chamber or oven, preferably of sufficient size to receive two barrels $n$ placed side-by-side as shown in Fig. 2. The barrels are adapted to be lifted by tackle $o$, and are supported within the heating chamber on rests $p$, the covers $q$, $q$, of the chamber being replaced after the barrels are in place. A very fierce heat is generated in the closed chamber $h$ by the furnace and the material in the barrels melts and falls on to the bottom of the chamber which is maintained at a high temperature and the material is rendered thoroughly liquid.

The bottom of the chamber slopes downwardly at a substantial angle towards the tank, and the surface $k'$ forms a highly heated weir over which the material passes in a thin film and is rendered thoroughly fluid. The firebrick or other lining $k^2$ of the closure $k$ may be made thinner if desired beneath the surface $k'$ to assist in achiving this result.

Before reaching the surface $k'$ the material is strained of solid impurities by passing through one or more perforated partitions or diaphragms $r$ which run transversely across the rear part of the chamber. These partitions preferably slide between guides $s$ on the side walls of the chamber as shown in Fig. 3 so they can readily be removed for cleaning purposes.

The material in the tank $g$ is maintained at a suitable temperature by the great volume of heated air and gases from the furnace which are led through the flue $l$ below the tank to the rear end of the machine.

This flue is preferably divided longitudinally by a partition $t$. A damper $u$ is provided at the forward end of the flue by which the whole of the gases can be directed into the flue above the partition to heat the contents of the tank, or into the flue below the partition, and so to the hood $u$ by which they are directed on to the road surface.

Further dampers $v$, $w$ at the rear end of the flue permit the gases from above the partition to be directed either downwardly into the hood or upwardly into an uptake or chimney $x$ at the rear end of the tank.

The hot gases from the furnace can thus be ultilized to heat the road surface only, or to heat both simultaneously.

The hood $y$ as previously mentioned forms no part of the present invention and need not be described herein.

I claim:—

1. In a road making and repairing apparatus, the combination with a storage tank for melted material, and a preliminary melting chamber arranged directly above a furnace and at a higher level than the tank, of a highly heated inclined surface extending between the lower end of a sloping bottom to said melting chamber and the upper end of a vertical end wall to said tank, and removable straining plates arranged across said melting chamber adjacent to the junction of the bottom thereof with the inclined surface.

2. In a road making and repairing apparatus, the combination of a wheeled chassis, a furnace mounted thereon, a preliminary heating chamber arranged directly above said furnace, a sloping bottom to said chamber forming the roof of said furnace, removable straining plates arranged across the lower end of said chamber, an inclined highly heated surface extending between the lower end of said chamber bottom, and the upper edge of the vertical end wall of a storage tank mounted on the chassis at a lower level than the heating chamber, means for leading the products of combustion from the furnace under the storage tank to heat the contents thereof, and means for directing the products of combustion either upwardly into a flue or downwardly on to a road surface.

3. In a road making and repairing apparatus, the combination of a wheeled chassis, a furnace mounted thereon, means for forcing an air draught through said furnace, a preliminary heating chamber arranged above said furnace, straining means at the end of said chamber, an inclined and highly heated surface extending between the end of said chamber and the upper edge of the end wall of a storage tank arranged at a lower level than said inclined surface, a flue leading the hot products of combustion from said furnace below said storage tank, a longitudinal partition dividing said flue, and means for directing the hot gases either into the flue above the partition to heat the tank or into the flue below the partition from which they are directed on to the road surface.

In testimony whereof I affix my signature.

JOHN HINES.